(12) United States Patent
Keeling et al.

(10) Patent No.: US 9,941,708 B2
(45) Date of Patent: Apr. 10, 2018

(54) SYSTEMS, METHODS, AND APPARATUS FOR INTEGRATED TUNING CAPACITORS IN CHARGING COIL STRUCTURE

(71) Applicant: QUALCOMM Incorporated, San Diego, CA (US)

(72) Inventors: Nicholas Athol Keeling, Munich (DE); Michael Le Gallais Kissin, Auckland (NZ); Mickel Bipin Budhia, Auckland (NZ); Chang-Yu Huang, Auckland (NZ); Jonathan Beaver, Auckland (NZ); Hao Hao, Auckland (NZ); Claudio Armando Camasca Ramirez, Auckland (NZ)

(73) Assignee: QUALCOMM Incorporated, San Diego, CA (US)

(*) Notice: Subject to any disclaimer, the term of this patent is extended or adjusted under 35 U.S.C. 154(b) by 280 days.

(21) Appl. No.: 14/802,012

(22) Filed: Jul. 17, 2015

(65) Prior Publication Data

US 2016/0126746 A1    May 5, 2016

Related U.S. Application Data

(60) Provisional application No. 62/075,300, filed on Nov. 5, 2014.

(51) Int. Cl.
*B60L 11/18* (2006.01)
*H02J 5/00* (2016.01)
(Continued)

(52) U.S. Cl.
CPC ............ *H02J 5/005* (2013.01); *B60L 3/04* (2013.01); *B60L 11/123* (2013.01);
(Continued)

(58) Field of Classification Search
None
See application file for complete search history.

(56) References Cited

U.S. PATENT DOCUMENTS

| 6,068,782 A * | 5/2000 | Brandt | H05K 1/162 |
| | | | 216/13 |
| 7,569,952 B1 * | 8/2009 | Bono | H02K 35/02 |
| | | | 310/15 |

(Continued)

FOREIGN PATENT DOCUMENTS

| KR | 100541029 B1 | 1/2006 |
| WO | 2013036146 A1 | 3/2013 |
| WO | 2014137109 A1 | 9/2014 |

OTHER PUBLICATIONS

International Search Report and Written Opinion—PCT/US2015/058176—ISA/EPO—dated Jan. 27, 2016.

*Primary Examiner* — Jared Fureman
*Assistant Examiner* — Joel Barnett
(74) *Attorney, Agent, or Firm* — Smith Tempel Blaha LLC/Qualcomm

(57) ABSTRACT

Systems, methods, and apparatus are disclosed for power transfer including a plurality of coil structures located over a ferrite element, the plurality of coil structures configured to generate a high flux region and a low flux region, the low flux region being located between the plurality of coil structures, and a tuning capacitance located directly over the ferrite element in the low flux region.

20 Claims, 14 Drawing Sheets

(51) Int. Cl.
*H02J 17/00* (2006.01)
*H01F 38/14* (2006.01)
*H02J 7/00* (2006.01)
*B60L 3/04* (2006.01)
*B60L 11/12* (2006.01)
*H01F 27/36* (2006.01)
*H02J 50/00* (2016.01)
*H02J 7/02* (2016.01)

(52) U.S. Cl.
CPC ......... *B60L 11/182* (2013.01); *B60L 11/1816* (2013.01); *B60L 11/1824* (2013.01); *B60L 11/1833* (2013.01); *B60L 11/1842* (2013.01); *B60L 11/1844* (2013.01); *B60L 11/1846* (2013.01); *B60L 11/1861* (2013.01); *B60L 11/1877* (2013.01); *H01F 27/365* (2013.01); *H01F 38/14* (2013.01); *H02J 7/0027* (2013.01); *H02J 17/00* (2013.01); *H02J 50/00* (2016.02); *B60L 2200/12* (2013.01); *B60L 2210/30* (2013.01); *B60L 2210/40* (2013.01); *B60L 2250/16* (2013.01); *B60L 2270/147* (2013.01); *H02J 7/025* (2013.01); *Y02E 60/721* (2013.01); *Y02T 10/6217* (2013.01); *Y02T 10/7005* (2013.01); *Y02T 10/705* (2013.01); *Y02T 10/7022* (2013.01); *Y02T 10/7044* (2013.01); *Y02T 10/7055* (2013.01); *Y02T 10/7072* (2013.01); *Y02T 10/7077* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 7,675,197 B2 | 3/2010 | Tetlow et al. | |
| 7,885,050 B2 | 2/2011 | Lee | |
| 8,487,479 B2 | 7/2013 | Cook et al. | |
| 2007/0064406 A1* | 3/2007 | Beart | H01F 38/14 361/816 |
| 2010/0187912 A1* | 7/2010 | Kitamura | H02J 5/005 307/104 |
| 2010/0259217 A1* | 10/2010 | Baarman | H02J 5/005 320/108 |
| 2013/0154649 A1* | 6/2013 | Candy | G01V 3/107 324/329 |
| 2013/0200717 A1 | 8/2013 | Bourilkov et al. | |
| 2013/0270921 A1 | 10/2013 | Boys et al. | |
| 2013/0285463 A1 | 10/2013 | Covic et al. | |

* cited by examiner

SYSTEMS, METHODS, AND APPARATUS FOR INTEGRATED TUNING CAPACITORS IN CHARGING COIL STRUCTURE

RELATED APPLICATIONS

This application claims the benefit of U.S. Provisional Patent Application No. 62/075,300, entitled "Systems, Methods and Apparatus Related To Wireless Electric Vehicle Charging Including Integrated Tuning Capacitors In Charging Coil Structure," filed Nov. 5, 2014, the contents of which are hereby incorporated by reference in their entirety.

FIELD

The present disclosure relates generally to wireless power transfer, and more specifically to devices, systems, and methods for integrating tuning capacitors in a charging coil structure.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

A wireless charging system for electric vehicles may require transmit and receive couplers to be aligned within a certain degree to achieve an acceptable amount of charge transfer from the transmit coupler (the charge-producing element) to the receive coupler (the charge-receiving element). One of the factors that determines the efficiency of charge transfer from the transmit coupler to the receive coupler is the impedance matching between the transmit coupler and the receive coupler. One way of performing impedance matching between the transmit coupler and the receive coupler is by incorporating some form of tuning capacitance on either or both of the transmit coupler and the receive coupler.

One structure for providing effective charge transfer between the charge-producing element and the charge-receiving element is referred to as a series-series system. The term "series-series" refers to the circuit structure of the resonant circuit in each of the charge-producing element and the charge-receiving element that when located in particular relation to each other facilitate wireless power transfer. For a series-series system, the tuning capacitors that provide impedance matching between the transmit coupler and the receive coupler are typically integrated into the structure that houses the transmit coupler. However, integrating the tuning capacitors into the structure that houses the transmit coupler increases the thickness and overall size of the structure that houses the transmit coupler.

There is a need for systems, devices, and methods related to providing impedance matching while minimizing the thickness and overall size of the structure that houses the transmit coupler.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a device for power transfer comprising a plurality of coil structures located over a ferrite element, the plurality of coil structures configured to generate a high flux region and a low flux region, the low flux region being located between the plurality of coil structures, and a tuning capacitance located directly over the ferrite element in the low flux region.

Figure 1:
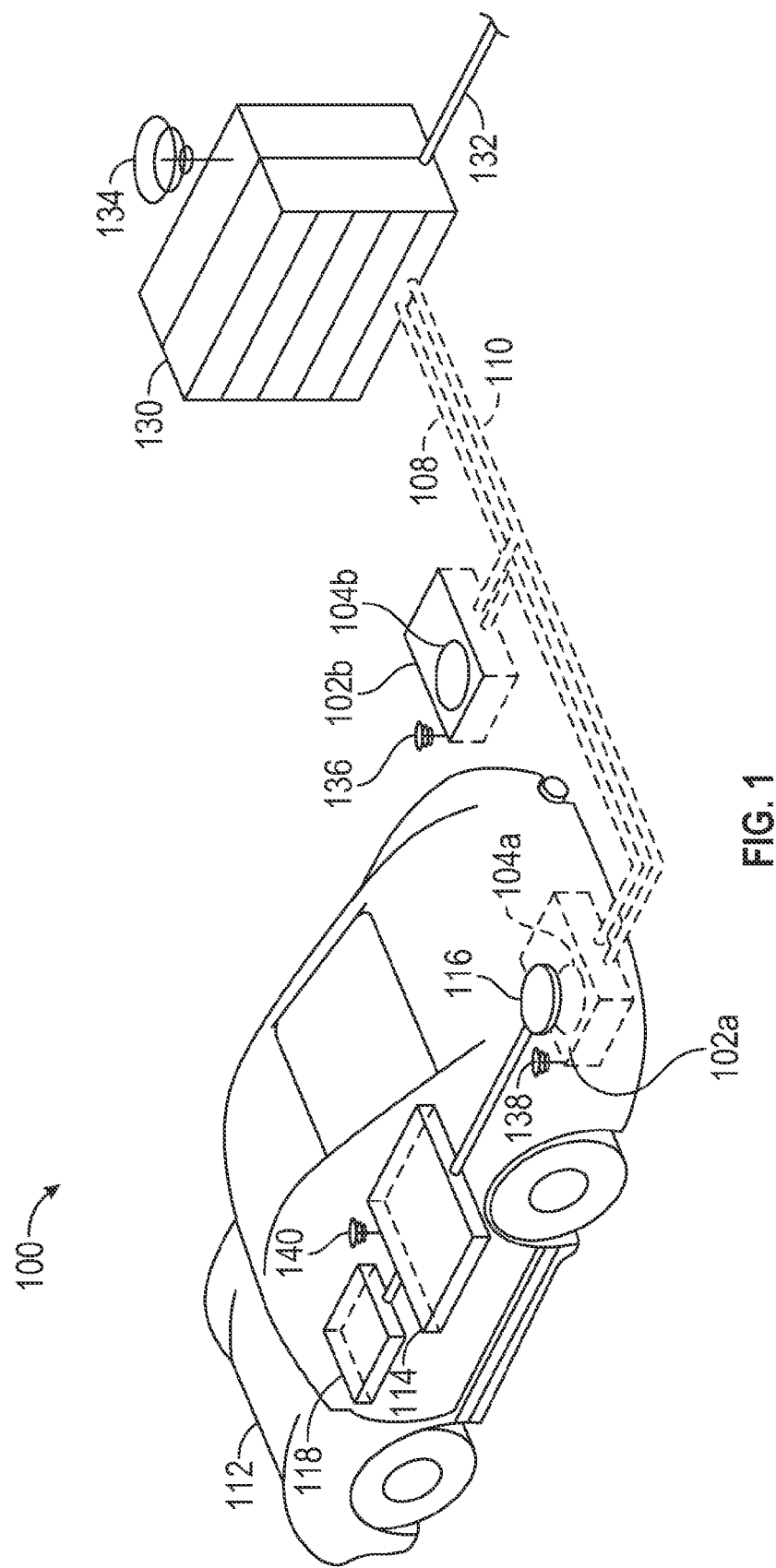
FIG. 1 illustrates an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle, in accordance with an exemplary embodiment. The wireless power transfer system 100 enables charging of an electric vehicle 112 while the electric vehicle 112 is parked such to efficiently couple with a base wireless charging system 102a. Spaces for two electric vehicles are illustrated in a parking area to be parked over corresponding base wireless charging systems 102a and 102b. In some embodiments, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also include a base coupler 104a and 104b, respectively, for wirelessly transferring (transmitting or receiving) power. In some other embodiments (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary embodiments, the electric vehicle coupler 116 may receive power when the electric vehicle coupler 116 is located in an energy field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to the "near field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\frac{1}{2}\pi$ of wavelength of the base coupler 104a (and vice versa for the electric vehicle coupler 116) as will be further described below.

Local distribution center 130 may be configured to communicate with external sources (e.g., a power grid) via a communication backhaul 134, and with the base wireless charging system 102a via a communication link 108. The base common communication unit (BCC) as shown in some diagrams herein may be part of the local distribution center 130.

In some embodiments the electric vehicle coupler 116 may be aligned with the base coupler 104a and, therefore, disposed within a near-field region simply by the electric vehicle operator positioning the electric vehicle 112 such that the electric vehicle coupler 116 comes in sufficient alignment relative to the base coupler 104a. Alignment may be said sufficient when an alignment error has fallen below a tolerable value. In other embodiments, the operator may be given visual feedback, auditory feedback, or combinations thereof to determine when the electric vehicle 112 is properly placed within the tolerance area for wireless power transfer. In yet other embodiments, the electric vehicle 112 may be positioned by an autopilot system, which may move the electric vehicle 112 until sufficient alignment is achieved. This may be performed automatically and autonomously by the electric vehicle 112 without or with only minimal driver intervention. This may possible with an electric vehicle 112 that is equipped with a servo steering, radar sensors (e.g., ultrasonic sensors), and intelligence for safely maneuvering and adjusting the electric vehicle. In still other embodiments, the electric vehicle 112, the base wireless charging system 102a, or a combination thereof may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
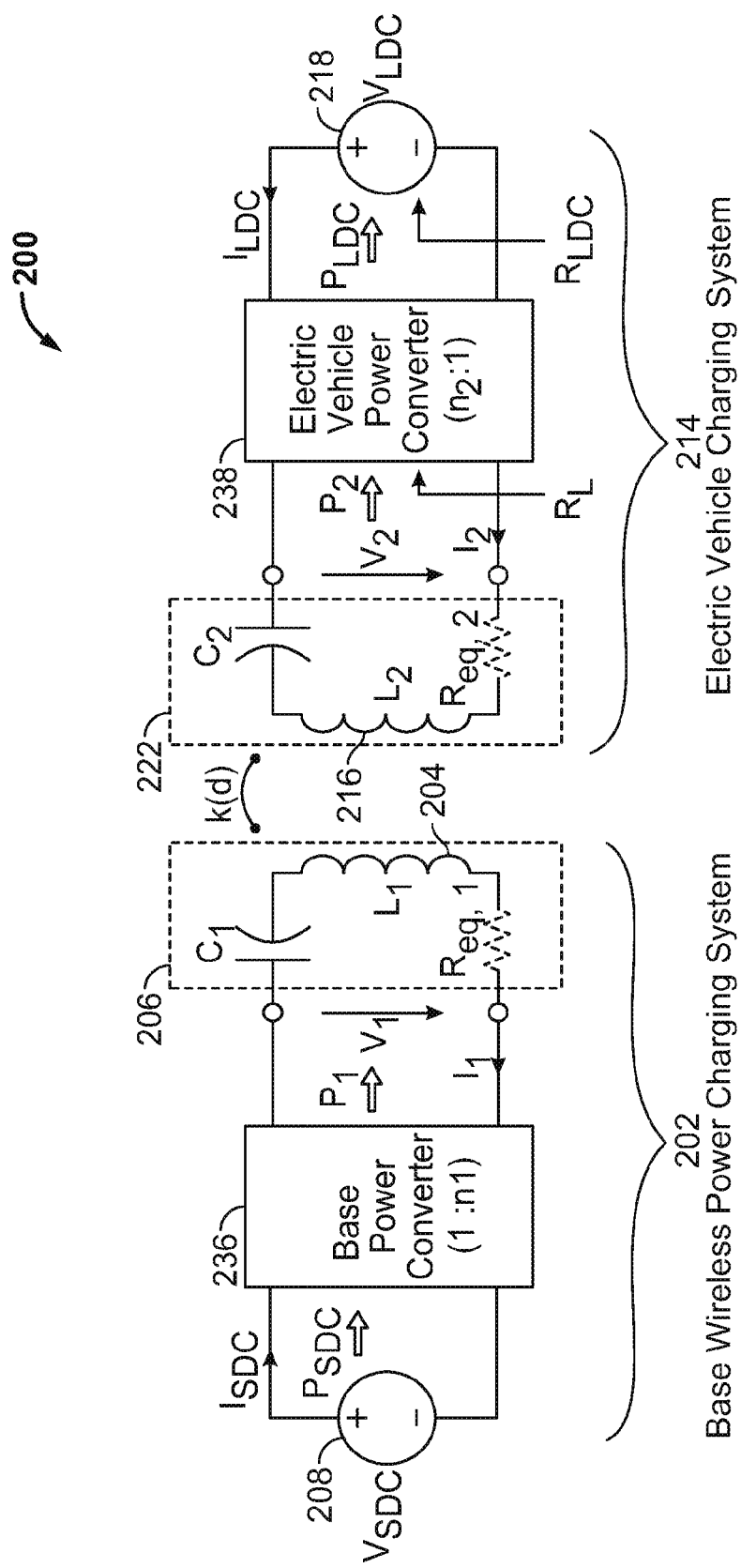
FIG. 2 is a schematic diagram of exemplary core components of the wireless power transfer system of FIG. 1.

FIG. 2 is a schematic diagram of showing exemplary components of wireless power transfer system 200, which may be employed in wireless power transfer system 100 of FIG. 1. As shown in FIG. 2, the wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Embodiments described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle coupler 216 and the base coupler 204. Using resonant structures for coupling energy may be referred to as "magnetic coupled resonance," "electromagnetic coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor C1 in series with base coupler 204 to emit an electromagnetic field at the operating frequency. The series-tuned resonant circuit 206 should be construed exemplary. In another embodiment, the capacitor $C_1$ may be coupled with the base coupler 204 in parallel. In yet other embodiments, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the power level provided wirelessly by the base coupler 204 may be on the order of kilowatts (kW) (e.g., anywhere from 1 kW to 110 kW or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field coupling mode region of the base coupler and vice versa, as further explained below. In this case, the base coupler 204 and the electric vehicle coupler 216 may become coupled to one another such that power may be transferred from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another, embodiment, the capacitor $C_2$ may be coupled with the electric vehicle coupler 216 in parallel. In yet other embodiments, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the power sink 218 that may represent the electric vehicle battery unit. The electric vehicle power converter 238 may provide the converted power $P_{LDC}$ to the power sink 218. The power supply 208, base power converter 236, and base coupler 204 may be stationary and located at a variety of locations as discussed above. The electric vehicle power sink 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) to safely disconnect the electric vehicle power sink 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards the electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some embodiments, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an electromagnetic near-field rather than via electromagnetic waves in the far field, which may involve substantial losses due to radiation into the space. When in the near field, a coupling mode may be established between the transmit coupler and the receive coupler. The space around the couplers where this near field coupling may occur is referred to herein as a near field coupling mode region.

While not shown, the base power converter 236 and the electric vehicle power converter 238 if bidirectional may both include for the transmit mode an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed embodiments may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including coupler and tuning capacitor may be designed to have a high quality (Q) factor to improve energy transfer efficiency. For example, the Q factor may be 300 or greater.

As described above, according to some embodiments, coupling power between two couplers that are in the near field of one another is disclosed. As described above, the near field may correspond to a region around the coupler in which mainly reactive electromagnetic fields exist. If the physical size of the coupler is much smaller than the wavelength related to the frequency, there is no substantial loss of power due to waves propagating or radiating away from the coupler. Near-field coupling-mode regions may correspond to a volume that is near the physical volume of the coupler, typically within a small fraction of the wavelength. According to some embodiments, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
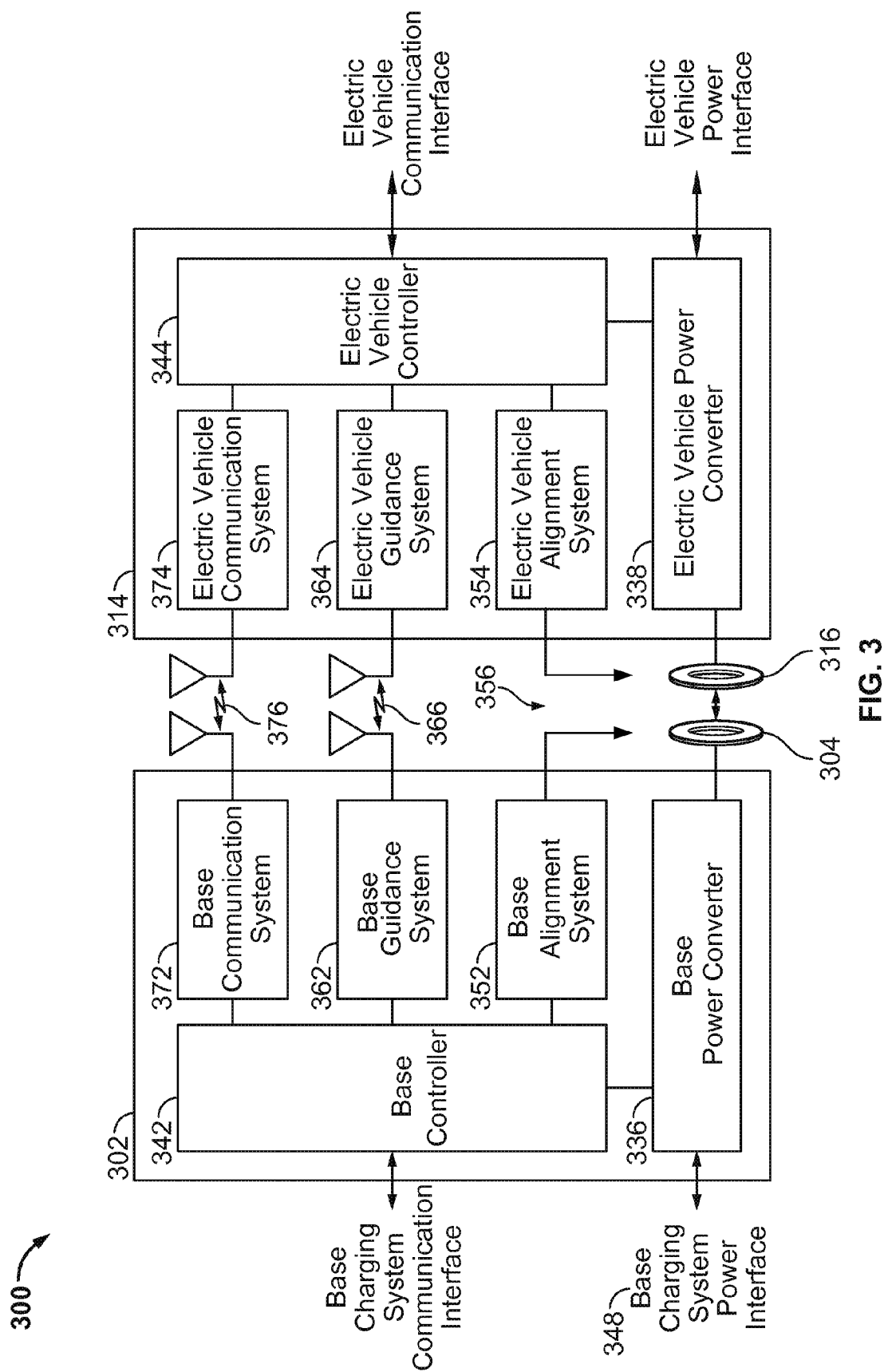
FIG. 3 is a functional block diagram showing exemplary core and ancillary components of the wireless power transfer system of FIG. 1.

FIG. 3 is a functional block diagram showing exemplary components of wireless power transfer system 300, which may be employed in wireless power transfer system 100 of FIG. 1 and/or in which wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 354 or the base alignment system 352, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some embodiments, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some embodiments, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking "park by wire" that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication couplers or antennas. Thus, some embodiments of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

To enable wireless high power transfer, some embodiments may be configured to transfer power at a frequency in the range from 10-150 kHz. This low frequency coupling may allow highly efficient power conversion that may be achieved using solid state switching devices. In some embodiments, the wireless power transfer systems 100, 200, and 300 described herein may be used with a variety of electric vehicles 112 including rechargeable or replaceable batteries.

Figure 4:
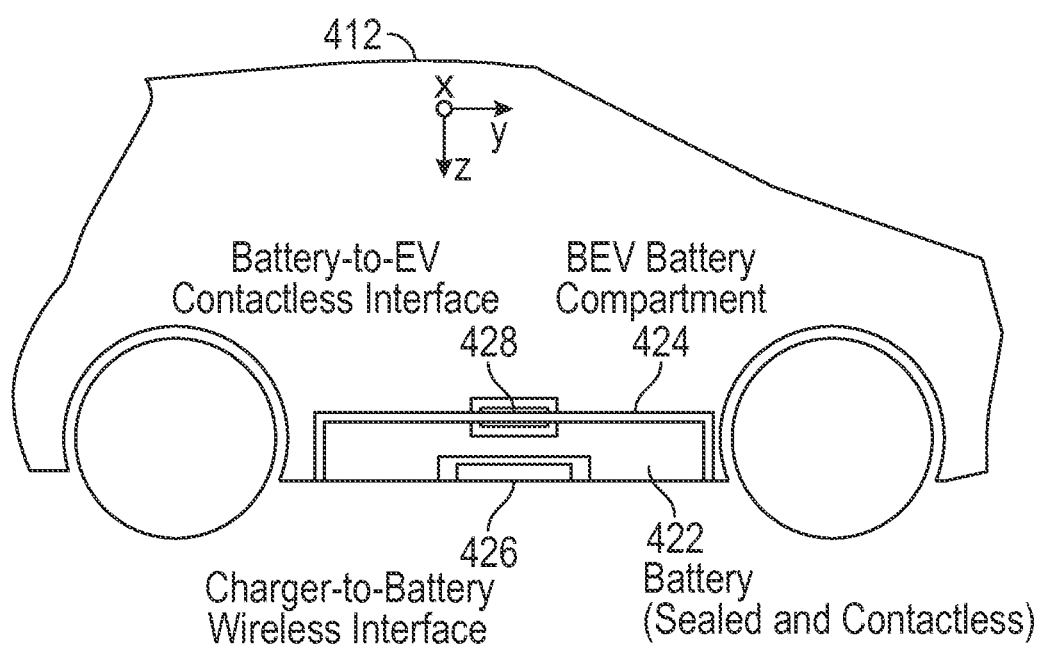
FIG. 4 illustrates the concept of a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position may be useful for an electric vehicle battery unit (not shown) that integrates a wireless power interface (e.g., a charger-to-battery wireless interface 426) and that may receive power from a ground-based wireless charging unit (not shown), e.g., embedded in the ground. In FIG. 4, the electric vehicle battery unit may be a rechargeable battery unit, and may be accommodated in a battery compartment 424. The electric vehicle battery unit also provides the charger-to-battery wireless power interface 426, which may integrate the entire electric vehicle wireless power subsystem including a coupler, resonance tuning and power conversion circuitry, and other control and communications functions as needed for efficient and safe wireless energy transfer between the ground-based wireless charging unit and the electric vehicle battery unit.

It may be useful for a coupler of the electric vehicle (e.g., electric vehicle coupler 116) to be integrated flush with a bottom side of the electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. Beside the charger-to-battery wireless power interface 426 that may provide wireless power and communication between the electric vehicle 412 and the ground-based wireless charging unit, the electric vehicle battery unit 422 may also provide a battery-to-EV contactless interface 428, as shown in FIG. 4.

In some embodiments, and with reference to FIG. 1, the base coupler 104a and the electric vehicle coupler 116 may be in a fixed position and the couplers are brought within a near-field coupling mode region, e.g., by overall placement of the electric vehicle coupler 116 relative to the base wireless charging system 102a. However, in order to perform energy transfer rapidly, efficiently, and safely, the distance between the base coupler 104a and the electric vehicle coupler 116 may need to be reduced to improve coupling. Thus, in some embodiments, the base coupler 104a and/or the electric vehicle coupler 116 may be deployable and/or moveable in a vertical direction to bring them closer together (to reduce the air gap).

With reference to FIG. 1, the charging systems described above may be used in a variety of locations for charging the electric vehicle 112, or transferring power back to a power grid. For example, the transfer of power may occur in a parking lot environment. It is noted that a "parking area" may also be referred to herein as a "parking space" or a "parking stall." To enhance the efficiency of a wireless power transfer system 100, the electric vehicle 112 may be aligned along an X direction and a Y direction to enable the electric vehicle coupler 116 within the electric vehicle 112 to be adequately aligned with the base coupler 104a within an associated parking area.

Furthermore, the disclosed embodiments are applicable to parking lots having one or more parking spaces or parking areas, wherein at least one parking space within a parking lot may comprise the base wireless charging system 102a, in the following also referred to a charging base 102. In some embodiments, the charging base 102 may just comprise the base coupler 104a and the residual parts of the base wireless charging system are installed somewhere else. For example, a common parking area can contain a plurality of charging bases, each in a corresponding parking space of the common parking area. Guidance systems (not shown in FIG. 1) may be used to assist a vehicle operator in positioning the electric vehicle 112 in a parking area to align the electric vehicle coupler 116 within the electric vehicle 112 with the base coupler 104a as part of the base wireless charging system 102a. Guidance systems may include electronic based approaches (e.g., radio-based positioning, for example, using UWB signals, triangulation, position and/or direction finding principles based on magnetic field sensing (e.g., magnetic vectoring), and/or optical, quasi-optical and/or ultrasonic sensing methods), mechanical-based approaches (e.g., vehicle wheel guides, tracks or stops), or any combination thereof, for assisting an electric vehicle operator in positioning the electric vehicle 112 to enable the electric vehicle coupler 116 within the electric vehicle 112 to be adequately aligned with a base coupler 104a.

As discussed above, the electric vehicle charging unit 114 may be placed on the underside of the electric vehicle 112 for transmitting/receiving power to/from the base wireless charging system 102a. For example, the electric vehicle coupler 116 may be integrated into the vehicles underbody preferably near a center position providing maximum safety distance in regards to electromagnetic field exposure and permitting forward and reverse parking of the electric vehicle.

Figure 5A:
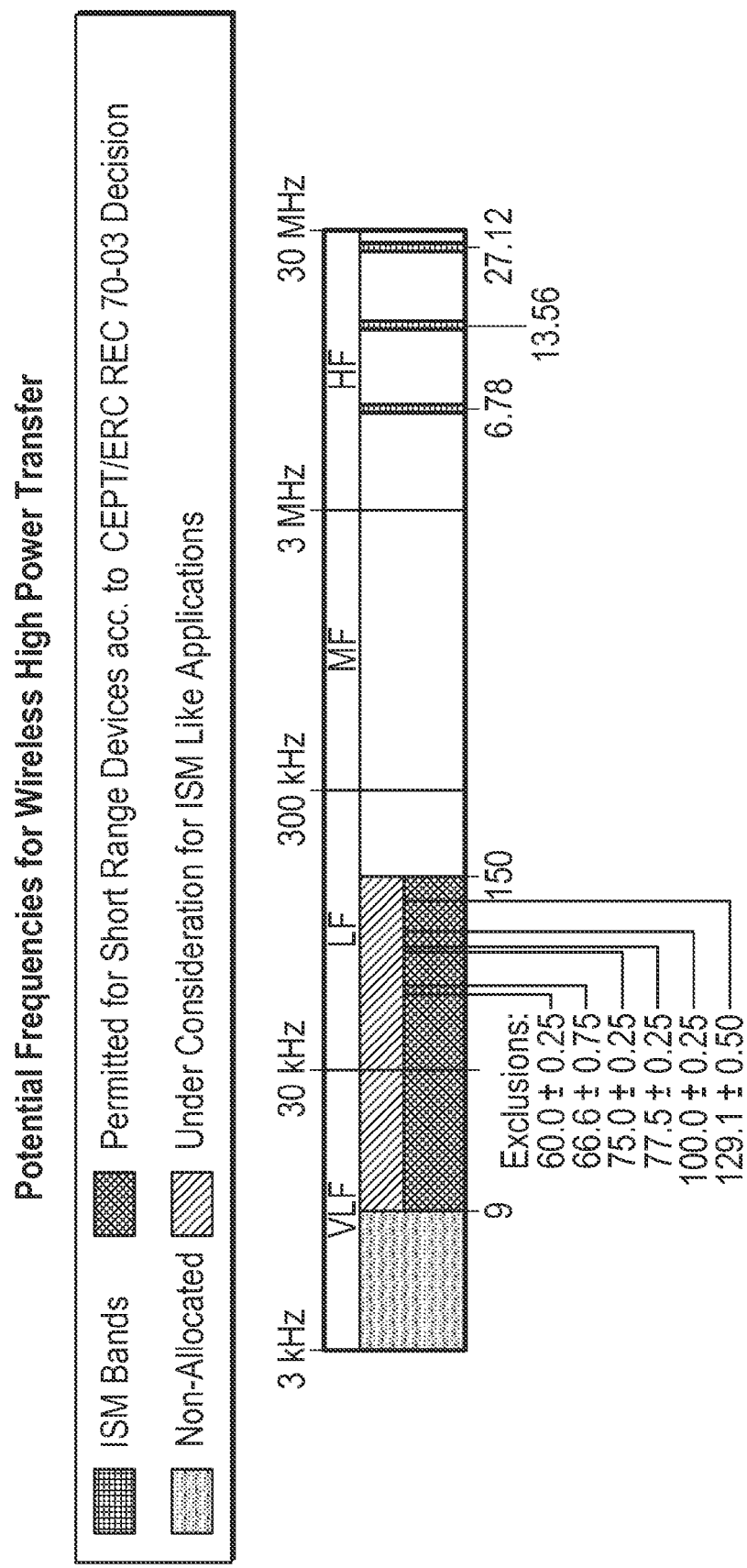
FIG. 5A is a chart of a frequency spectrum showing exemplary frequencies that may be used for wireless charging of an electric vehicle, in accordance with an exemplary embodiment of the invention.

FIG. 5A is a chart of a frequency spectrum showing exemplary frequencies that may be used for wireless charging the electric vehicle 112, in accordance with an exemplary embodiment of the invention. As shown in FIG. 5A, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 5B:
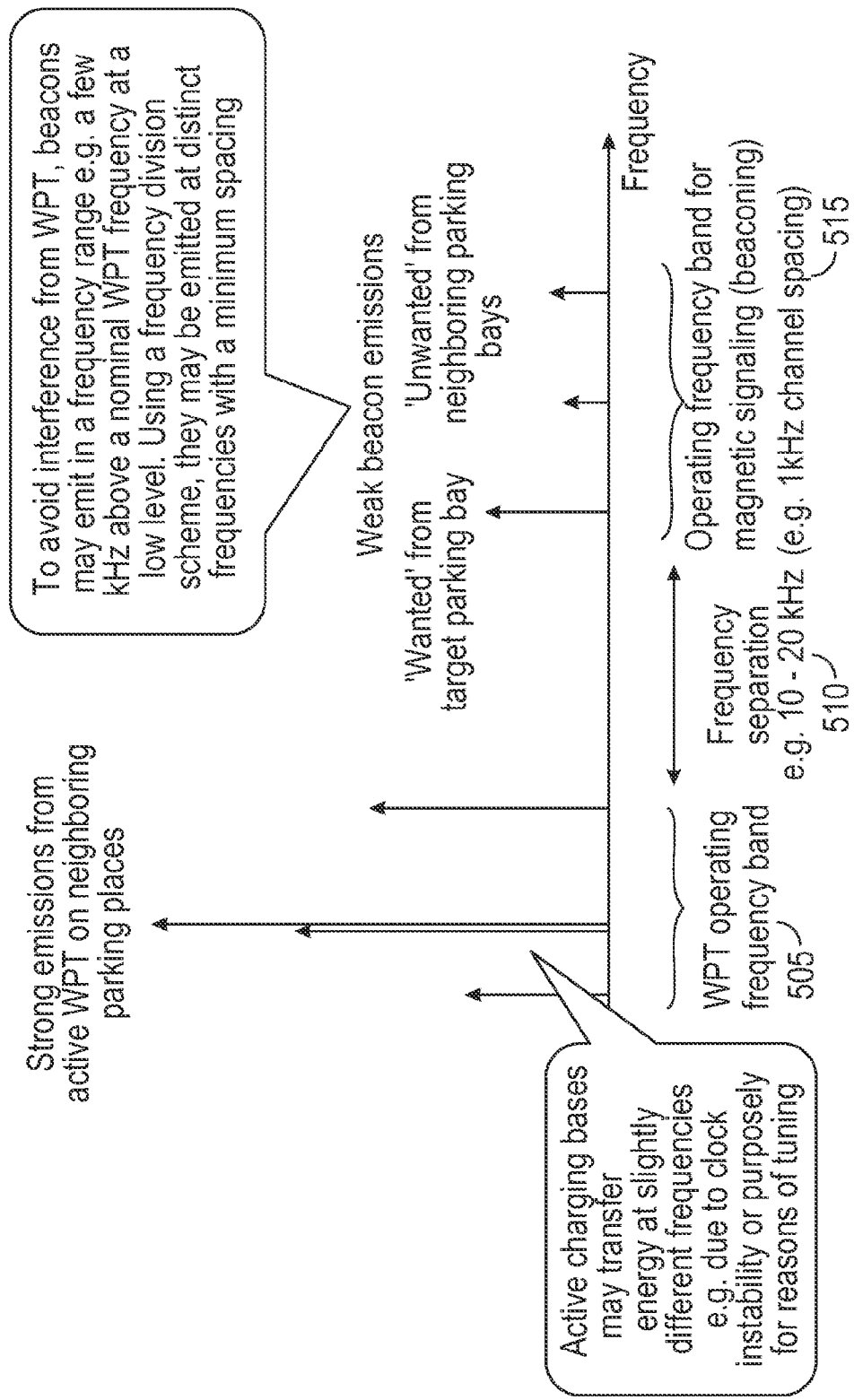
FIG. 5B is a chart of a frequency spectrum showing exemplary frequencies that may be used for wireless charging of an electric vehicle and for providing magnetic information/beacon signals, in accordance with an exemplary embodiment of the invention.

FIG. 5B is a diagram of a portion of a frequency spectrum showing exemplary frequencies that may be used for wireless power transfer (WPT) and exemplary frequencies for the low level magnetic information, or beacon, signals that may be used for ancillary purposes in wireless charging of electric vehicles, e.g., for positioning (magnetic vectoring) or pairing of electric vehicle communication entities with base communication entities, in accordance with an exemplary embodiment. As shown in FIG. 5B, WPT may occur within a WPT operating frequency band 505 at the lower end of the frequency spectrum portion shown in FIG. 5B. As shown, active charging bases may transfer power wirelessly at slightly different frequencies within the WPT operating frequency band 505, e.g., due to frequency instability or purposely for reasons of tuning. In some embodiments the WPT operating frequency band 505 may be located within one of the potential frequency ranges depicted in FIG. 5A. In some embodiments, an operating frequency band for magnetic signaling (beaconing) 515 may be offset from the WPT operating frequency band 505 by a frequency separation 510 to avoid interference. It may be located above the WPT operating frequency band 505 as shown in FIG. 5B. In some aspects, the frequency separation may comprise an offset of 10-20 kHz or more. In some aspects, using a frequency division scheme, active charging bases may emit magnetic beacons at distinct frequencies with certain channel spacing. In some aspects, the frequency channel spacing within the operating frequency band for magnetic signaling (beaconing) 515 may comprise 1 kHz channel spacing.

Figure 6:
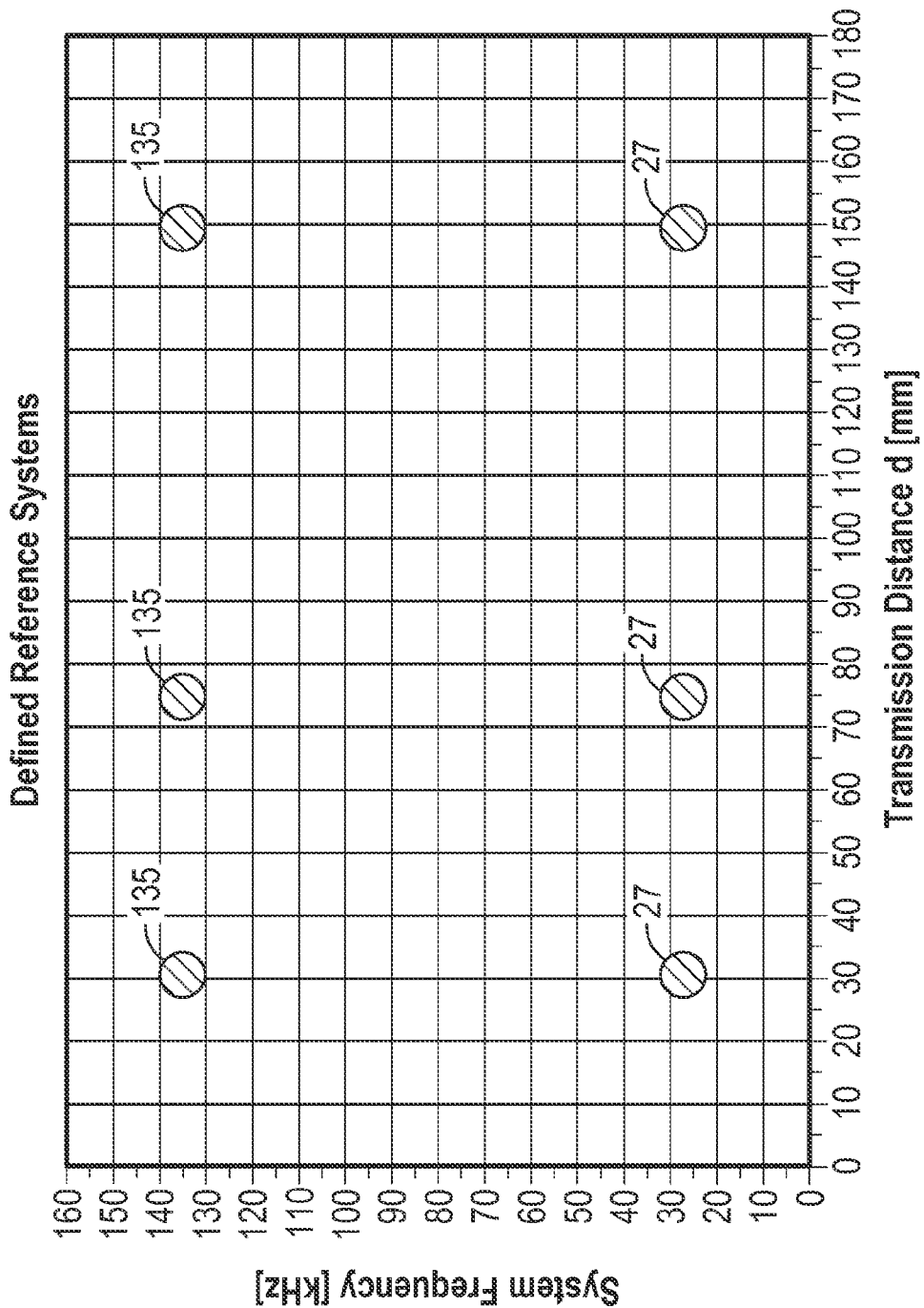
FIG. 6 is a chart showing exemplary frequencies and transmission distances that may be useful in wireless charging of electric vehicles, in accordance with an exemplary embodiment of the invention.

FIG. 6 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of the electric vehicle 112, the base wireless charging system 102a of the wireless power transfer system 100 with reference to FIG. 1 may go through various states of operation. The wireless power transfer system 100 may include one or more base wireless charging systems (e.g., 102a and 102b). The base wireless charging system 102a may include at least one of a controller and a power conversion unit, and a base coupler such as base controller 342, base power converter 336, and base coupler 304 as shown in FIG. 3. The wireless power transfer system 100 may include the local distribution center 130, as illustrated in FIG. 1, and may further include a central controller, a graphical user interface, a base common communications entity, and a network connection to a remote server or group of servers.

To enhance the efficiency of a wireless power transfer system 100, the electric vehicle 112 may be aligned (e.g., using a magnetic field) along an X direction and a Y direction to enable the electric vehicle coupler 116 within the electric vehicle 112 to be adequately aligned with the base coupler 104 within an associated parking area. In order to achieve maximum power under regulatory constraints (e.g., electromagnetic field strength limits) and maximum transfer efficiencies, the alignment error between the base coupler 104a and the electric vehicle coupler 116 may be set as small as possible.

Guidance systems (such as the guidance systems 362 and 364, described above with respect to FIG. 3) may be used to assist a vehicle operator in positioning the electric vehicle 112 in a parking area to align the electric vehicle coupler 116 within the electric vehicle 112 with the base coupler 104a of the base wireless charging system 102a. When the electric vehicle coupler 116 and the base coupler 104 are aligned such that the coupling efficiency between electric vehicle coupler 116 and the base coupler 104a is above a certain threshold value, then the two are said to be within a "sweet-spot" (tolerance area) for wireless charging. This "sweet spot" area may be also defined in terms of emissions, e.g., if vehicle is parked in this tolerance area, the magnetic leakage field as measured in the surrounding of the vehicle is always below specified limits, e.g., human exposure limits.

Guidance systems may include various approaches. In one approach, guidance may include assisting an electric vehicle operator in positioning the electric vehicle on the "sweet spot" using a display or other optical or acoustic feedback based on determining a position and/or direction of the electric vehicle coupler relative to the base coupler. In another approach, guidance may include direct and automatic guiding of the vehicle based on determining a position and/or direction of the electric vehicle coupler 116 relative to the base coupler 104.

For determining a position and/or direction, various approaches may apply such as electromagnetic wave-based approaches (e.g., radio-based methods, using microwave wideband signals for propagation time measurements and triangulation), acoustic wave-based approaches (e.g., using ultrasonic waves for propagation time measurements and triangulation) optical or quasi-optical approaches (e.g., using optical sensors and electronic cameras), inertia-based approaches (e.g., using accelerometers and/or gyrometers), air pressure-based approaches (e.g., for determining floor level in a multi-story car park), inductive-based approaches (e.g., by sensing a magnetic field as generated by a WPT base coupler or other dedicated inductive loops).

In a further approach, guidance may include mechanical-based approaches (e.g., vehicle wheel guides, tracks or stops). In yet another approach, guidance may include any combination of above approaches and methods for guidance and determining a position and/or direction. The above guidance approaches may also apply for guidance in an extended area, e.g., inside a parking lot or a car park requiring a local area positioning system (e.g., indoor positioning) in which positioning refers to determining a position and/or direction.

A positioning or localization method may be considered practical and useful if it works reliably in all conditions as experienced in an automotive environment indoors (where there is no reception of a global satellite-based navigation system, such as GPS) and outdoors, in different seasonal weather conditions (snow, ice, water, foliage), at different day times (sun irradiation, darkness), with signal sources and sensors polluted (dirt, mud, dust, etc.), with different ground properties (asphalt, ferroconcrete), in presence of vehicles and other reflecting or obstructing objects (wheels of own vehicle, vehicles parked adjacent, etc.) Moreover, for the sake of minimizing infrastructure installation complexity and costs, methods not requiring installation of additional components (signal sources, antennas, sensors, etc.) external to the physical units of the base wireless charging system 302 (with reference to FIG. 3) may be preferable. This aspect may also apply to the vehicle-side. In a preferred embodiment, all vehicle-side components of the guidance system 364 including antennas and sensors are fully integrated into the physical units of the electric vehicle wireless charging system 314. Likewise, in a preferred embodiment, all base-side components of the guidance system 362 including antennas and sensors are fully integrated into the physical units of the base wireless charging system 302.

In one embodiment of an inductive-based approach and with reference to FIG. 3, either the base coupler 304 or the electric vehicle coupler 316, or any other dedicated inductive loops included in the base wireless charging system 302 or the electric vehicle charging system 314, may generate an alternating magnetic field also referred to as the "magnetic field beacon signal" or the "magnetic sense field" that can be sensed by a sensor system or circuit, which may be either included in the electric vehicle charging system 314 or included in the base wireless charging system 302, respectively. The frequency for the magnetic field beacon signal, which may be used for purposes of guidance and alignment (positioning) and pairing of communications entities, may be identical to the operating frequency of the WPT or different from the WPT frequency but low enough so that sensing for positioning takes place in the near-field. An example of one suitable frequency may be at low frequency (LF) (e.g., in the range from 20-150 kHz). The near-field property ($3^{rd}$ power law decay of field strength vs. distance) of a low frequency (LF) magnetic field beacon signal and the characteristics of the magnetic vector field pattern may be useful to determine a position with an accuracy sufficient for many cases. Furthermore, this inductive-based approach may be relatively insensitive to environmental effects as listed above. The magnetic field beacon signal may be generated using the same coil or the same coil arrangement as used for WPT. In some embodiments, one or more separate coils specifically for generating or sensing the magnetic field beacon signal may be used and may resolve some potential issues and provide a reliable and accurate solution.

In one aspect, sensing the magnetic field beacon signal may solely provide an alignment score that is representative for the WPT coupling but it may not be able to provide a vehicle operator with more information (e.g., an actual alignment error and how to correct in case of a failed parking attempt). In this aspect, the WPT coil of base and electric vehicle couplers may be used for generating and sensing the magnetic field and coupling efficiency between base and electric vehicle coupler may be determined by measuring the short circuit current or the open circuit voltage of the sensing WPT coil knowing the field generating current. The current required in this alignment (or measuring) mode may be lower than that typically used for normal WPT and the frequency may be the same.

In another aspect and with reference to FIG. 1, sensing the magnetic field may provide position information over an extended range which can be used to assist a driver in accurately parking the electric vehicle 112 in the "sweet spot" of the wireless charging station. Such a system may include dedicated active field sensors that are frequency selective and more sensitive than ordinary current or voltage transducers used in a WPT system. To comply with human exposure standards, the magnetic sense field may have to be reduced to levels below those used for measuring coupling efficiency as described above. This may be particularly true, if the base coupler 104 generates the magnetic sense field and the active surface of the base coupler 104 is not always covered by the electric vehicle 112.

In a different aspect, sensing a magnetic near field may also apply for positioning (guidance) outside a parking stall in an extended area, e.g., inside a car park. In this aspect, magnetic field sources may be road-embedded in the access aisles or drive ways.

In an embodiment of an electromagnetic-based approach, a guidance system may use ultra-wide band (UWB) technology. Techniques based on UWB technology operating at microwaves, e.g., in the K-Band (24 GHz) or E-Band (77 GHz) frequency range (for automotive use) have the potential of providing sufficient temporal resolution, enabling accurate ranging and mitigation of multi-path effects. A positioning method based on UWB may be robust enough to cope with wave propagation effects such as obstruction (e.g., obstruction by vehicle wheels), reflection (e.g. reflection from vehicles parked adjacent), diffraction as expected in a real environment assuming antennas integrated into at least one of the physical units of the base wireless charging system 102, the physical units of the electric vehicle wireless charging unit 114 and the vehicle coupler 116 as shown in FIG. 1 that is mounted at bottom of vehicle's chassis. A method based on a narrowband radio frequency (RF) technology (e.g., operating in the ultra-high frequency (UHF) band) and simply measuring radio signal strength (indicative for distance) may not provide sufficient accuracy and reliability in such an environment. As opposed to the field strength of the magnetic near field, field strength of radio waves in free space decreases only linearly with distance. Moreover signal strength may vary considerably due to fading as caused by multipath reception and path obstruction, making accurate ranging based on a signal strength vs. distance relationship difficult.

In one embodiment, either the base wireless charging system 102 or the electric vehicle 112 may emit and receive UWB signals from a plurality of integrated antennas sufficiently spaced to enable accurate triangulation. In one exemplary aspect, one or more UWB transponders are used onboard the electric vehicle 112 or in the base wireless charging system 102, respectively. A relative position can be determined by measuring signal round-trip delays and by performing triangulation.

In another aspect, either the base wireless charging system 102 or the electric vehicle 112 may emit UWB signals from a plurality of integrated antennas sufficiently spaced to enable accurate triangulation. A plurality of UWB receivers are mounted either on the electric vehicle 112 or are integrated into the base wireless charging system 102, respectively. Positioning is performed by measuring relative time of arrival (ToA) of all received signals and triangulation, similarly to a satellite-based positioning system (GPS).

In one aspect, UWB transceivers as part of the base wireless charging system 102 or an onboard system of the electric vehicle 112 may be also used (reused) for detection of foreign objects in a critical space, e.g., where the magnetic field as generated by the base wireless charging system 102 exceeds certain safety levels. These objects may be dead objects, e.g., metal objects subject to eddy current heating or living objects such as humans or animals subject to excessive magnetic field exposure.

Figure 7:
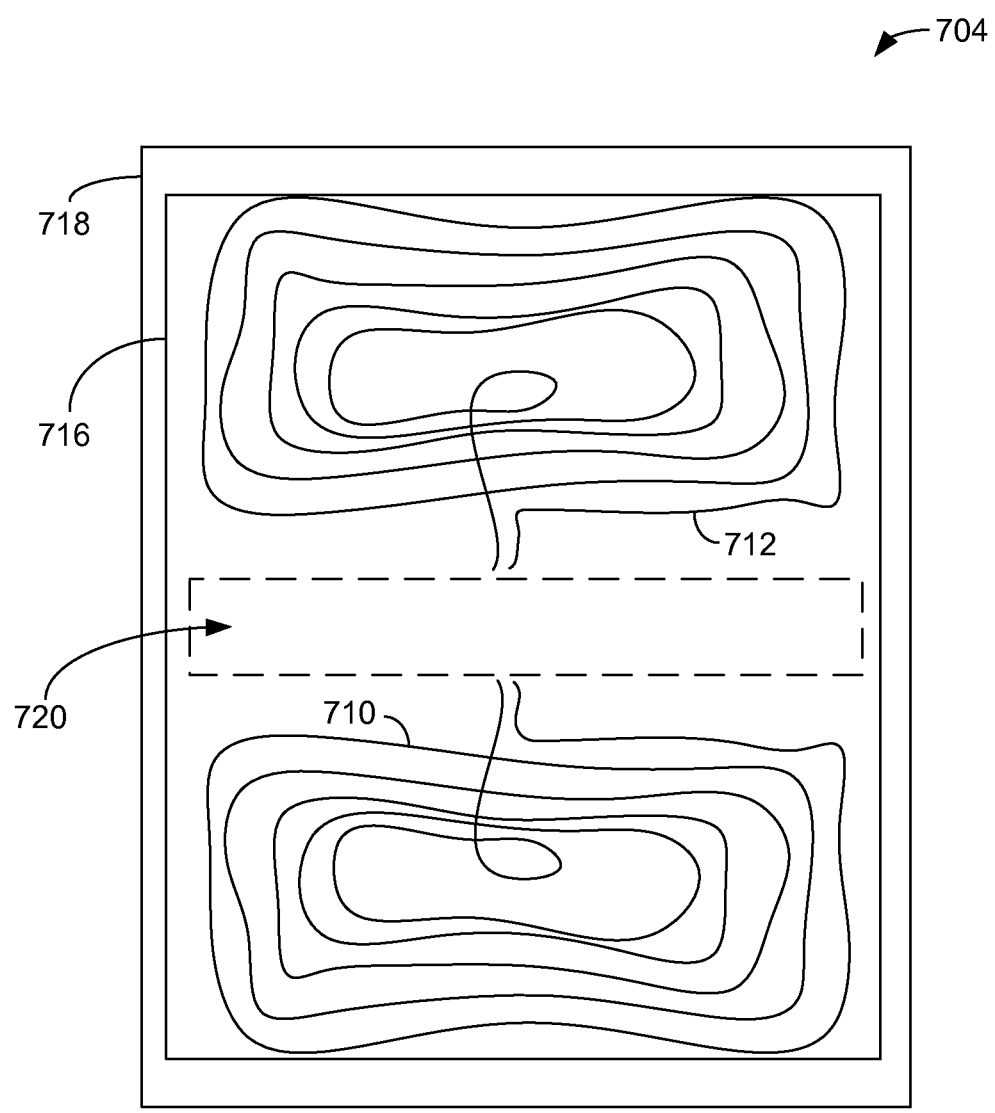
FIG. 7 is a schematic diagram showing an exemplary embodiment of integrating tuning capacitors in a charging coil structure.

FIG. 7 is a schematic diagram showing an exemplary embodiment of integrating tuning capacitors in a charging coil structure. A base coupler 704 may comprise one or more "conductor loops", and more specifically, "multi-turn conductor loops" or coils. In an exemplary embodiment, the base coupler 704 comprises coils 710 and 712 located over a ferrite element 716. The ferrite element 716 may comprise a sheet or panel of ferrite material. The ferrite element 716 can be located over a mounting plate 718 that forms a part of the enclosure for the base coupler 704. The base coupler 704 may also comprise a top cover (not shown) so that the base coupler 704 can be protected from environmental conditions. To provide impedance matching and to create a resonant circuit with the coils 710 and 712, one or more capacitive elements (such as those embodied by capacitor $C_1$ in FIG. 2) are typically connected to the coils 710 and 712. In an exemplary embodiment, one or more capacitive elements, also referred to as tuning capacitances or tuning capacitors, such as, for example only, surface mount ceramic capacitors, can be located in an area or region 720 directly over the ferrite element 716 and between the coils 710 and 712. In an exemplary embodiment, the coils 710 and 712 are generally "D" shaped or oval shaped, with the coils 710 and 712 referred to as a D-D coil structure. In an exemplary embodiment, the region 720 occupies a relatively "low flux" area or region when there is electrical current present in the coils 710 and 712. Electrical current may be present in the coils 710 and 712 regardless of whether the coils 710 and 712 are transferring power to an electric vehicle coupler (not shown in FIG. 7). Locating the impedance matching capacitive elements in the region 720 allows the impedance matching capacitive elements to be integrated within the base coupler 704 in a previously unused area, thus minimizing the overall area and thickness of the base coupler 704. Moreover, locating the capacitors in the low flux region reduces eddy current effects and reduces heating.

Although described as locating the impedance matching capacitive elements in the region 720 between the coils 710 and 712 in a charging coil structure, a similar structure having the impedance matching capacitive elements located between coils can be provided in an electric vehicle coupler associated with an electric vehicle to provide impedance matching for a charge-receiving structure.

Figure 8:
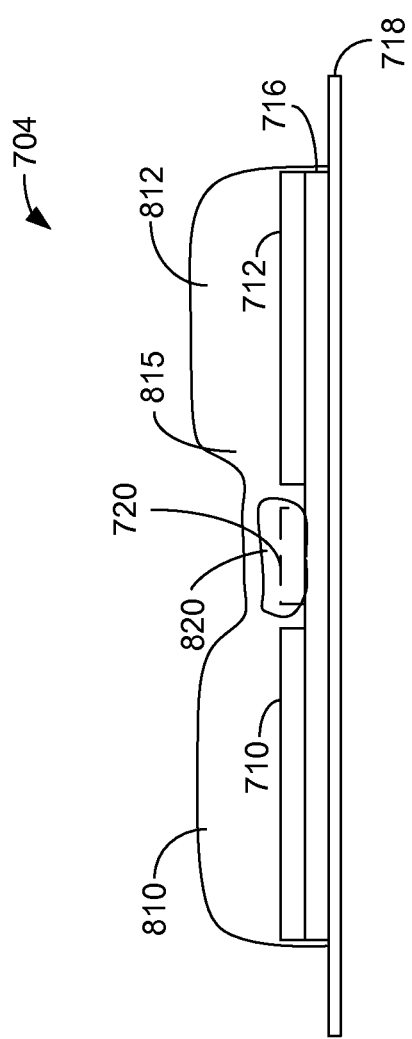
FIG. 8 is a cross sectional view of the base coupler of FIG. 7.

FIG. 8 is a cross sectional view of the base coupler of FIG. 7. The base coupler 704 comprises the mounting plate 718 over which the ferrite element 716 is located. The coils 710 and 712 are located over the ferrite element 716. The coil 710 produces an exemplary high flux region 810 and the coil 712 produces an exemplary high flux region 812. In the absence of a charge-receiving structure, such as an electric vehicle coupler, the high flux region 810 and the high flux region 812 will take the shortest path toward each other and meet between the coils 710 and 712, forming a single high flux region 815. The nature of the high flux regions 710 and 712, and the single high flux region 815 also allows a low flux region 820 to be formed between the coils 710 and 720. Further, as will be described below, in the presence of a charge-receiving structure, the high flux region 810 and the high flux region 812 will also form a single high flux region 815, and will generally result in the low flux region 820 located between the coils 710 and 712. In an exemplary embodiment, the precise location, size and shape of the low flux region 820 will be affected by the presence or absence of a charge-receiving structure and, if a charge-receiving structure is present, whether the charge-receiving structure is receiving power from the coils 710 and 712. Typically, the coils 710 and 712 produce the high flux regions 810 and 812 when the base coupler 704 is located proximate to an electric vehicle coupler (not shown) so as to effect the transfer of power from the base coupler 704 to the electric vehicle coupler by virtue of the single high flux region 815. In an exemplary embodiment, the region 720 is located in a low flux region 820. In an exemplary embodiment, the region 720 provides an area between the coils 710 and 712 on which to locate the capacitive elements directly on the ferrite element 716 and within the low flux region 820.

Figure 9:
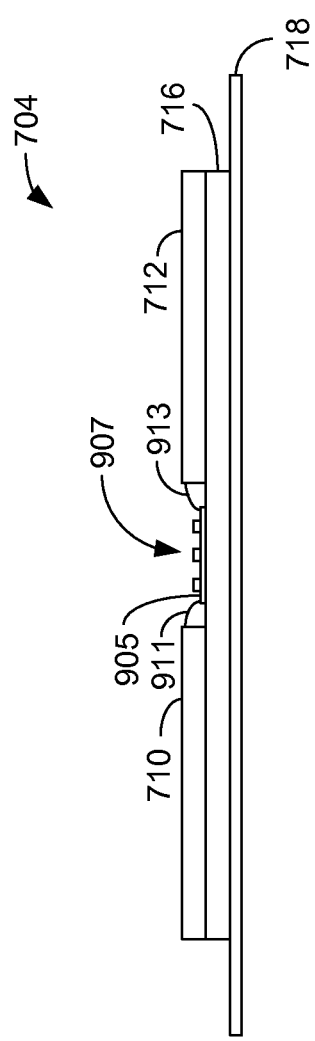
FIG. 9 is a cross sectional view of the base coupler of FIG. 7 showing an exemplary location of integrated tuning capacitors.

FIG. 9 is a cross sectional view of the base coupler of FIG. 7 showing an exemplary location of integrated tuning capacitors. The base coupler 704 comprises the mounting plate 718 over which the ferrite element 716 is located. The coils 710 and 712 are located over the ferrite element 716. In an exemplary embodiment, a printed circuit board (PCB) 905 having tuning capacitors 907 is located in the low flux region 820 (FIG. 8) between the coils 710 and 712 and directly on the ferrite element 716.

In accordance with an exemplary embodiment, locating the PCB 905 having the tuning capacitors 907 between the coils 710 and 712 also simplifies the electrical connections between the coils 710 and 712 and the PCB 905, and may eliminate external cabling and wiring. For example, the coil 710 can be electrically connected to the PCB 905 using a relatively short interconnection 911 and the coil 712 can be electrically connected to the PCB 905 using a relatively short interconnection 913. Moreover, locating the PCB 905 having the tuning capacitors 907 between the coils 710 and 712 within the area defined by the mounting plate 718 also simplifies the external connections of the base couple 704 and allows simpler environmental connections to the base coupler 704. Electrical connections (not shown) internal to the PCB 905 complete the electrical connection between the tuning capacitors 907 and the coils 710 and 712.

Figure 10:
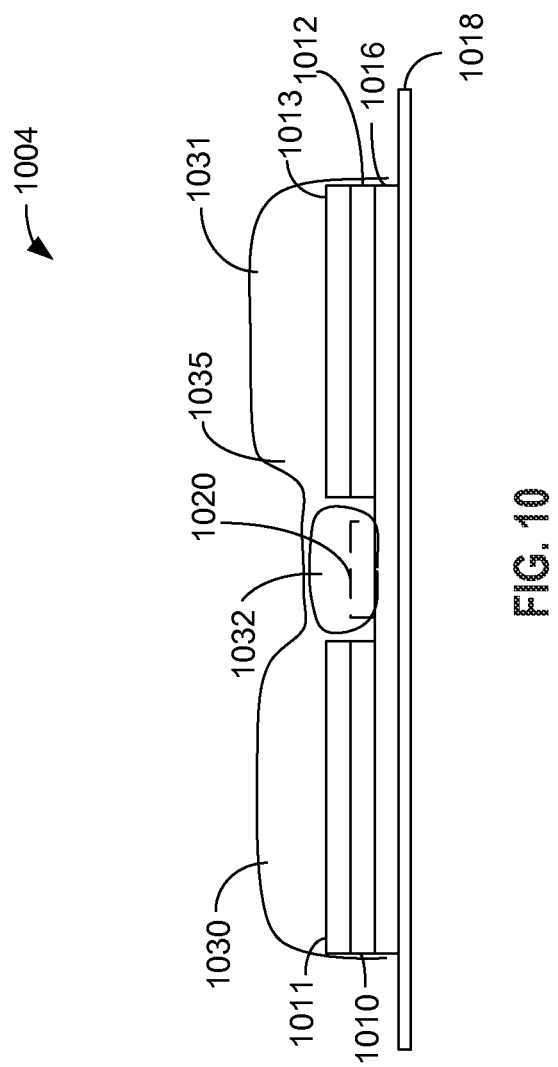
FIG. 10 is a schematic diagram showing an alternative exemplary embodiment of integrating tuning capacitors in a charging coil structure.

FIG. 10 is a schematic diagram showing an alternative exemplary embodiment of integrating tuning capacitors in a charging coil structure. In an exemplary embodiment, a base coupler 1004 comprises coils 1010 and 1012; and coils 1011 and 1013. In an exemplary embodiment, the coils 1010 and 1011 can be stacked vertically one over another, and the coils 1012 and 1013 can be stacked vertically one over another. The coils 1010 and 1012, and the coils 1011 and 1013 are located over a ferrite element 1016. The ferrite element 1016 may comprise a sheet or panel. The ferrite element 1016 can be located over a mounting plate 1018 that forms a part of the enclosure for the base coupler 1004. The base coupler 1004 may also comprise a top cover (not shown) so that the base coupler 1004 can be protected from environmental conditions. To provide impedance matching and to create a resonant circuit with the coils 1010, 1011, 1012 and 1013, one or more capacitive elements (such as those embodied by capacitor $C_1$ in FIG. 2) are typically connected to the coils 1010, 1011, 1012 and 1013.

The coils 1010 and 1011 produce an exemplary high flux region 1030 and the coils 1012 and 1013 produce an exemplary high flux region 1031. In the absence of a charge-receiving structure, such as an electric vehicle coupler, the high flux region 1030 and the high flux region 1031 will take the shortest path toward each other and meet between the stacked coils 1010 and 1011 and the stacked coils 1012 and 1013, forming a single high flux region 1035. Typically, the coils 1010 and 1011 produce the high flux region 1030 and the coils 1012 and 1013 produce the high flux region 1031 when there is electrical current present in the coils 1010, 1011, 1012 and 1013. The base coupler 1004 being located proximate to an electric vehicle coupler (not shown) affects the transfer of power from the base coupler 1004 to the electric vehicle coupler by virtue of the single high flux region 1035. The high flux region 1030 and the high flux region 1031, and, when formed, the single high flux region 1035, generally result in a low flux region 1032 between the coils 710 and 712.

In an exemplary embodiment, one or more capacitive elements can be located in an area or region 1020 directly over the ferrite element 1016 and between the stacked coils 1010 and 1011 and the stacked coils 1012 and 1013. In an exemplary embodiment, the coils 1010 and 1011 and the coils 1012 and 1013 are generally "D" shaped such that the region 1020 occupies a relatively "low flux" region 1032 when there is electrical current in the coils 1010 and 1011 and in the coils 1012 and 1013, regardless of whether the coils 1010, 1011, 1012 and 1013 are transferring power to an electric vehicle coupler (not shown in FIG. 10). Locating the impedance matching capacitive elements in the region 1020 allows the impedance matching capacitive elements to be integrated within the base coupler 1004, thus minimizing the area and thickness occupied by the base coupler 1004. Moreover, locating the capacitors in the low flux region reduces eddy current effects and reduces heating.

Figure 11:
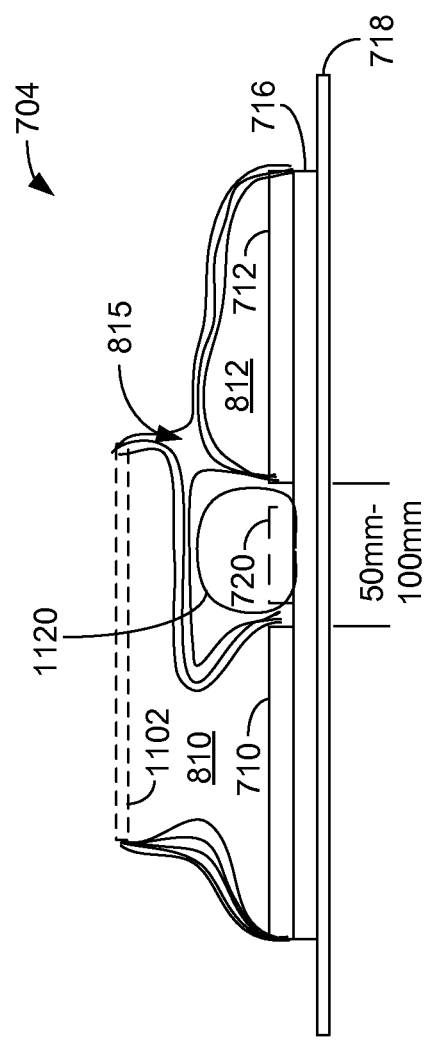
FIG. 11 is another cross sectional view of the base coupler of FIG. 7.

FIG. 11 is another cross sectional view of the base coupler of FIG. 7. The base coupler 704 comprises the mounting plate 718 over which the ferrite element 716 is located. The coils 710 and 712 are located over the ferrite element 716. An electric vehicle coupler 1102 is located proximate to the coil 710 and to the coil 712. Depending on the location of the electric vehicle coupler 1102 with respect to the coil 710 and the coil 712, in an exemplary embodiment, the coil 710 and the electric vehicle coupler 1102 produce an exemplary high flux region 810 and the coil 712 and the electric vehicle coupler 1102 produce an exemplary high flux region 812 through which power transfer from the coil 710 and the coil 712 to the electric vehicle coupler 1102 occurs. In this exemplary embodiment, the high flux regions 810 and 812 are produced by the same coupling between the coils 710 and 712 and the electric vehicle coupler 1102. Although schematically shown as two separate regions 810 and 812, the high flux regions 810 and 812 are linked together and transfer power together from the coils 710 and 712 to the electric vehicle coupler 1102. The high flux regions 810 and 812 form a single high-flux flux region 815 that can result in a generally circular or oblong shaped low flux region 1120 being formed around the capacitor location in the region 720. In an exemplary embodiment, the high flux regions 810 and 812 and the low flux region 1120 exist whenever there is current in the base coupler 704 having the coil 710 and the coil 712, regardless of the presence of a charge-receiving structure. Current can be present in the base pad without power or charge being transferred, such as shown above in FIG. 8 in which the single high flux region 815 and the low flux region 820 are formed between the coils 710 and 712 in the absence of a charge-receiving structure. Further, current can be present in the base pad without power or charge being transferred to a charge-receiving structure, even though a charge-receiving structure may be located proximate to the base pad. One or more electrical characteristics of the high flux region or regions can be used to define one or more electrical characteristics of the low flux region. For example, in the presence of the electric vehicle coupler 1102, the exemplary high flux regions 810 and 812 form a single high-flux flux region 815 that can result in the generally circular or oblong shaped low flux region 1120 being formed around the capacitor location in the region 720.

In an exemplary embodiment in which charge is being transferred to a charge receiving structure such as the electric vehicle coupler 1102, the size and shape of the low flux region 1120 is dependent on the presence of the electric vehicle coupler 1102 and on the amount of charge or power transfer from the coils 710 and 712 to the electric vehicle coupler 1102.

In an exemplary embodiment, the region 720 provides an area on which to locate the capacitive elements directly on the ferrite element 716 and within the low flux region 1120 between the coils 710 and 712. In an exemplary embodiment, the distance between the coils 710 and 712 can be on the order of 50 mm to 100 mm. However, the distance between the coils 710 and 712 can be other dimensions depending on application.

Figure 12:
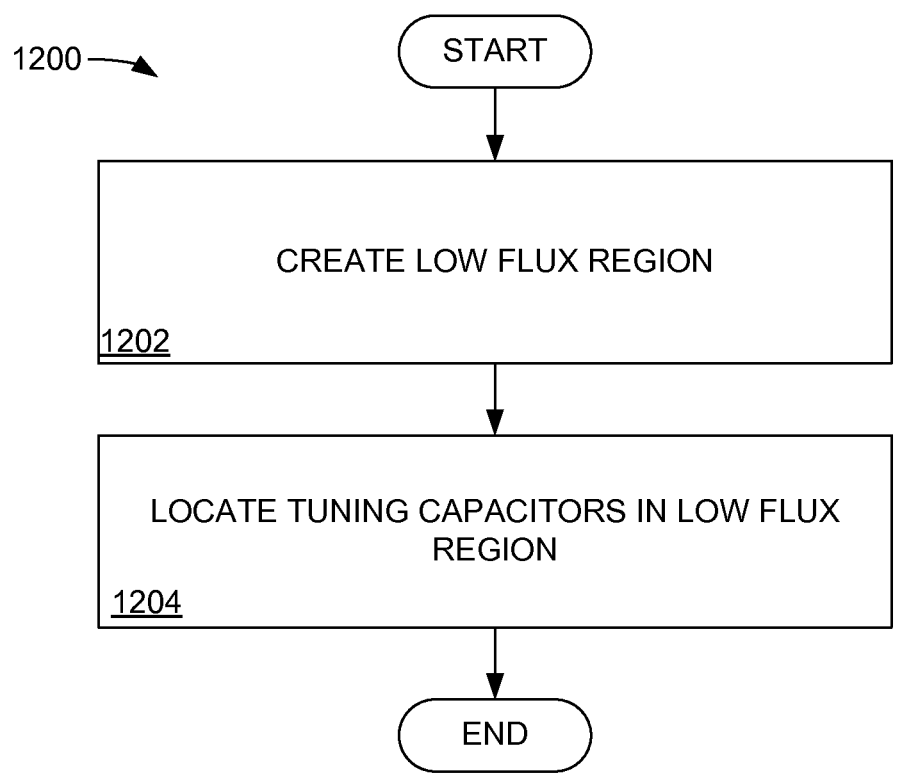
FIG. 12 is a flowchart illustrating an exemplary embodiment of a method for integrating tuning capacitors in a charging coil structure.

FIG. 12 is a flowchart illustrating an exemplary embodiment of a method for integrating tuning capacitors in a charging coil structure. The blocks in the flowchart 1200 can be performed in or out of the order shown.

In block 1202, a low flux region is created. In an exemplary embodiment, the low flux region is created as a result of the generation of one or more high flux regions using power transfer coils designed and operated to generate the one or more high flux regions and the low flux region.

In block 1204, tuning capacitors are located in the low flux region.

Figure 13:
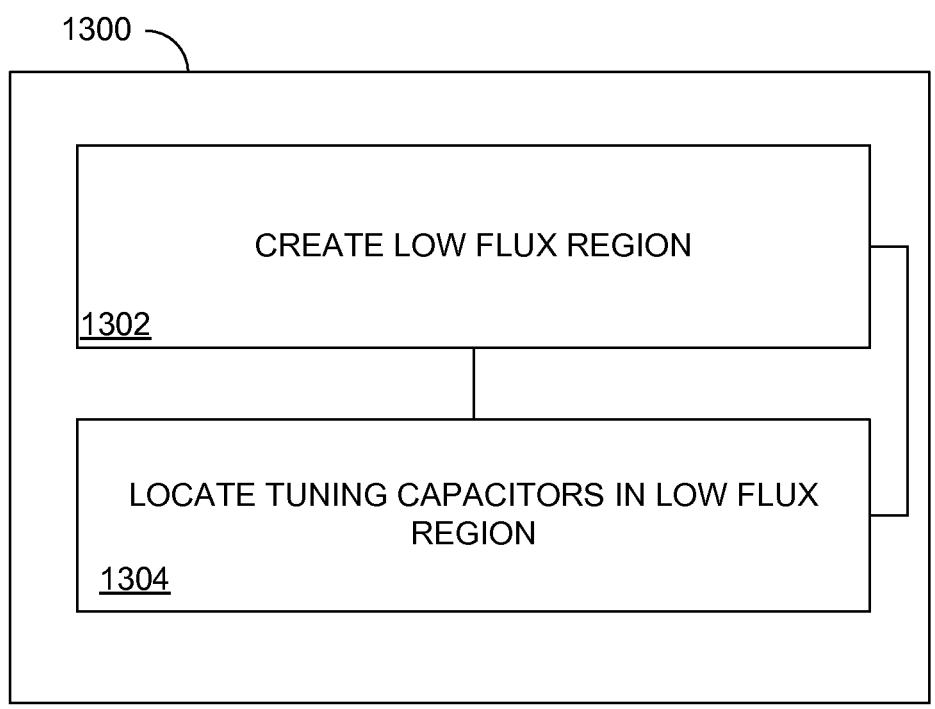
FIG. 13 is a functional block diagram of an apparatus for integrating tuning capacitors in a charging coil structure.

FIG. 13 is a functional block diagram of an apparatus 1300 for integrating tuning capacitors in a charging coil structure. The apparatus 1300 comprises means 1302 for creating a low flux region. In certain embodiments, the means 1302 for creating a low flux region can be configured to perform one or more of the function described in operation block 1202 of method 1200 (FIG. 12). The apparatus 1300 further comprises means 1304 for locating tuning capacitors in the low flux region. In certain embodiments, the means 1304 for locating tuning capacitors in the low flux region can be configured to perform one or more of the function described in operation block 1204 of method 1200 (FIG. 12).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for power transfer, comprising:
a plurality of coil structures located over a ferrite element, the plurality of coil structures configured to generate a high flux region and a low flux region, the low flux region being located between the plurality of coil structures; and
a tuning capacitance located directly over the ferrite element in the low flux region.

2. The device of claim 1, wherein the plurality of coil structures are "D" shaped.

3. The device of claim 1, wherein the plurality of coil structures comprise multiple vertically stacked coils.

4. The device of claim 1, wherein the low flux region is dependent on an amount of current present in the plurality of coil structures.

5. The device of claim 1, wherein the tuning capacitance comprises a plurality of surface mount capacitors located on a printed circuit board located between the plurality of coil structures directly over the ferrite element in the low flux region.

6. The device of claim 1, wherein an electrical characteristic of the high flux region defines an electrical characteristic of the low flux region.

7. The device of claim 1, wherein the high flux region is formed by a plurality of high flux regions in an absence of a charging-receiving structure.

8. The device of claim 1, wherein the high flux region is formed by a plurality of high flux regions in a presence of a charging-receiving structure.

9. A method for power transfer, comprising:
locating a plurality of coil structures over a ferrite element;
generating a high flux region and a low flux region, the low flux region being located between the plurality of coil structures; and
locating a tuning capacitance directly over the ferrite element in the low flux region.

10. The method of claim 9, further comprising forming the plurality of coil structures as "D" shaped.

11. The method of claim 9, further comprising forming the plurality of coil structures as multiple vertically stacked coils.

12. The method of claim 9, wherein the low flux region is dependent on an amount of current present in the plurality of coil structures.

13. The method of claim 9, further comprising forming the tuning capacitance as a plurality of surface mount capacitors located on a printed circuit board located between the plurality of coil structures directly over the ferrite element in the low flux region.

14. The method of claim 9, further comprising using an electrical characteristic of the high flux region to define an electrical characteristic of the low flux region.

15. The method of claim 9, further comprising forming the high flux region using a plurality of high flux regions in an absence of a charging-receiving structure.

16. The method of claim 9, further comprising forming the high flux region using a plurality of high flux regions in a presence of a charging-receiving structure.

17. A device for power transfer, comprising:
means for generating a high flux region and a low flux region, the low flux region being located between a plurality of coil structures; and
means for locating a tuning capacitance directly over a ferrite element in the low flux region.

18. The device of claim 17, further comprising means for forming the plurality of coil structures as "D" shaped.

19. The device of claim 17, further comprising means for forming the high flux region using a plurality of high flux regions in an absence of a charging-receiving structure.

20. The device of claim 17, further comprising means for forming the high flux region using a plurality of high flux regions in a presence of a charging-receiving structure.

* * * * *